United States Patent [19]

Hatori

[11] Patent Number: 5,778,382

[45] Date of Patent: Jul. 7, 1998

[54] DATA RETRIEVAL METHOD AND APPARATUS, AND STORAGE MEDIUM HOLDING PROGRAMS FOR EXECUTING SAID METHOD

[75] Inventor: Kenji Hatori, Hatogaya, Japan

[73] Assignee: Canon Kabushiki Kaisha, Tokyo, Japan

[21] Appl. No.: 667,607

[22] Filed: Jun. 21, 1996

[30] Foreign Application Priority Data

Jun. 23, 1995 [JP] Japan ................................. 7-157494

[51] Int. Cl.$^6$ ................................................. G06F 17/30
[52] U.S. Cl. ................................................. 707/104; 345/1
[58] Field of Search ................... 364/419.19; 707/104, 707/5, 3, 10; 345/440; 382/305; 1/1

[56] References Cited

U.S. PATENT DOCUMENTS

| | | | |
|---|---|---|---|
| 4,041,463 | 8/1977 | Slutzky et al. | 707/104 |
| 4,829,453 | 5/1989 | Katsuta et al. | 382/305 |
| 5,471,677 | 11/1995 | Imanaka | 707/5 |
| 5,515,488 | 5/1996 | Hoppe et al. | 345/440 |
| 5,619,694 | 4/1997 | Shimazu | 707/104 |
| 5,634,048 | 5/1997 | Ryu et al. | 707/10 |
| 5,652,881 | 7/1997 | Takahashi et al. | 707/104 |
| 5,680,558 | 10/1997 | Hatanaka et al. | 1/1 |

*Primary Examiner*—Thomas G. Black
*Assistant Examiner*—Shahid Alam
*Attorney, Agent, or Firm*—Fitzpatrick, Cella, Harper & Scinto

[57] ABSTRACT

A data retrieval method and apparatus for designating retrieval of items of data that satisfies a plurality of retrieval conditions, by using retrieval results which have already been retrieved based on one of the retrieval conditions and displayed. An item of data stored in a data storage is retrieved based on a keyword, and an icon of the retrieved data is displayed within an area corresponding to the keyword, on a display window. When a plurality such areas are displayed on the display window, if one area is designated and moved, in accordance with a relative distance between the areas, display positions of icons of data commonly included in the areas are moved closer to each other, while the other icons in the areas are moved away from those in the opposite side. If the areas are overlapped with each other, the icon of data commonly included in these areas is displayed within the overlap.

24 Claims, 13 Drawing Sheets

| RETRIEVAL CONDITION | RETRIEVAL RESULT DATA | | |
|---|---|---|---|
| SIZE : 1MB OR GREATER | chiken.jpg / ship.bmp | fish.jpg | horse.tif |
| COMPRESSED | chiken.jpg | fish.jpg | car.jpg |
| SIZE : 1MB OR GREATER, AND COMPRESSED | chiken.jpg | fish.jpg | |

DATA RETRIEVAL METHOD AND APPARATUS, AND STORAGE MEDIUM HOLDING PROGRAMS FOR EXECUTING SAID METHOD

BACKGROUND OF THE INVENTION

This invention relates to a data retrieval method and apparatus for retrieving a desired item of data from a plurality of items of data, and a storage medium holding programs for executing the method.

Figure 12:
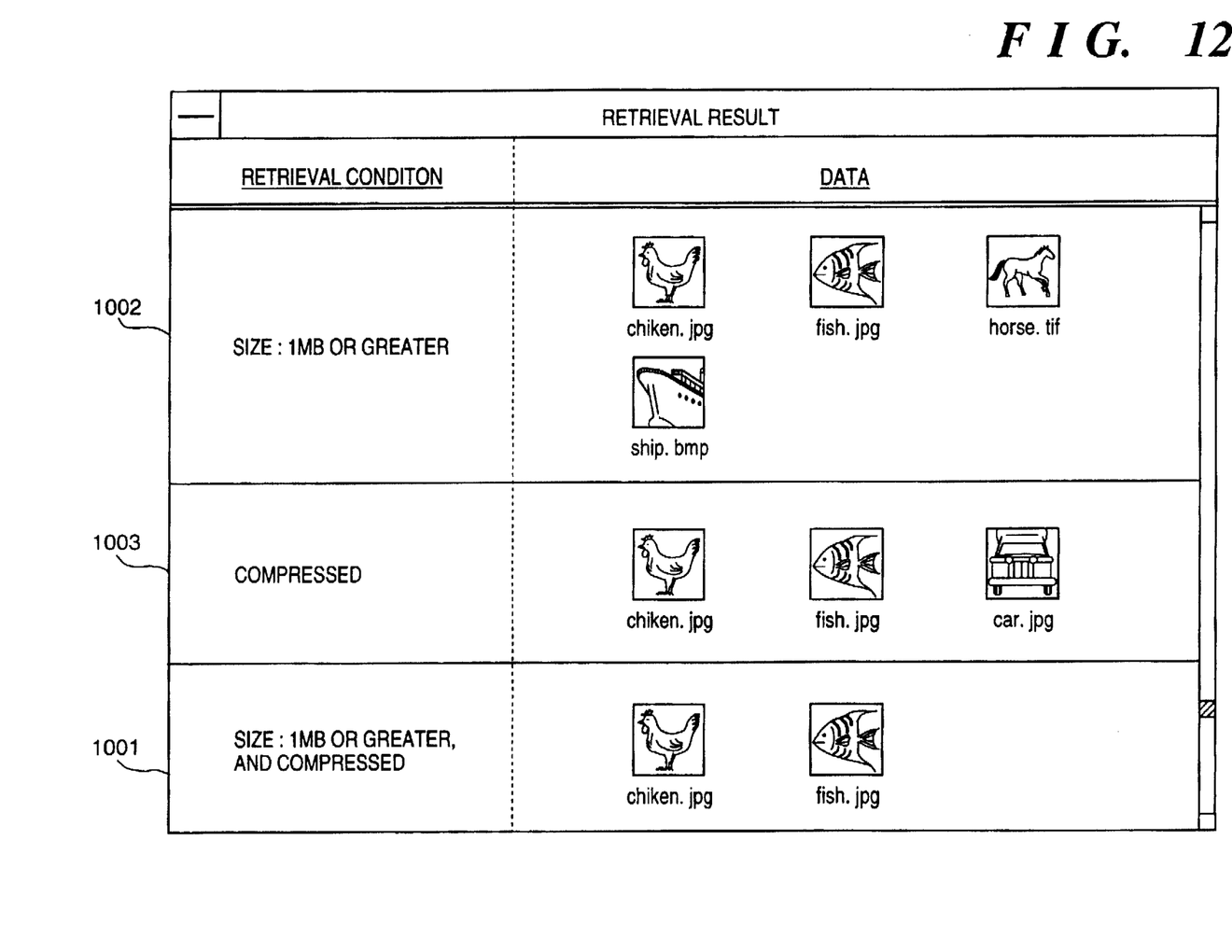
FIG. 12 is a display example of retrieval results of conventional retrieval processing.

Conventional data management systems have a retrieval method enabling designation of one or more retrieval conditions. This retrieval method retrieves an item of data that simultaneously satisfies a plurality of conditions (AND retrieval), or retrieves an item of data that satisfies any one of a plurality of conditions (OR retrieval). FIG. 12 shows an example of displayed retrieval results. In this example, the retrieval handles image data. In FIG. 12, reference numeral 1001 denotes items retrieved from among a plurality of items of image data stored in a hard disk or the like, based on retrieval conditions "data size: 1 MB or greater" and "compressed". Numeral 1002 denotes the result of retrieval based on the condition "data size: 1 MB or greater"; and 1003, the result of based on the retrieval condition "compressed". In FIG. 12, file names having the extension "jpg" represent image files compressed in accordance with the JPEG standard. The extension "bmp" represents a bit-map image (uncompressed) file; an the extension "tif", also an uncompressed image file.

However, the above conventional art has the following problems.

Figure 11:
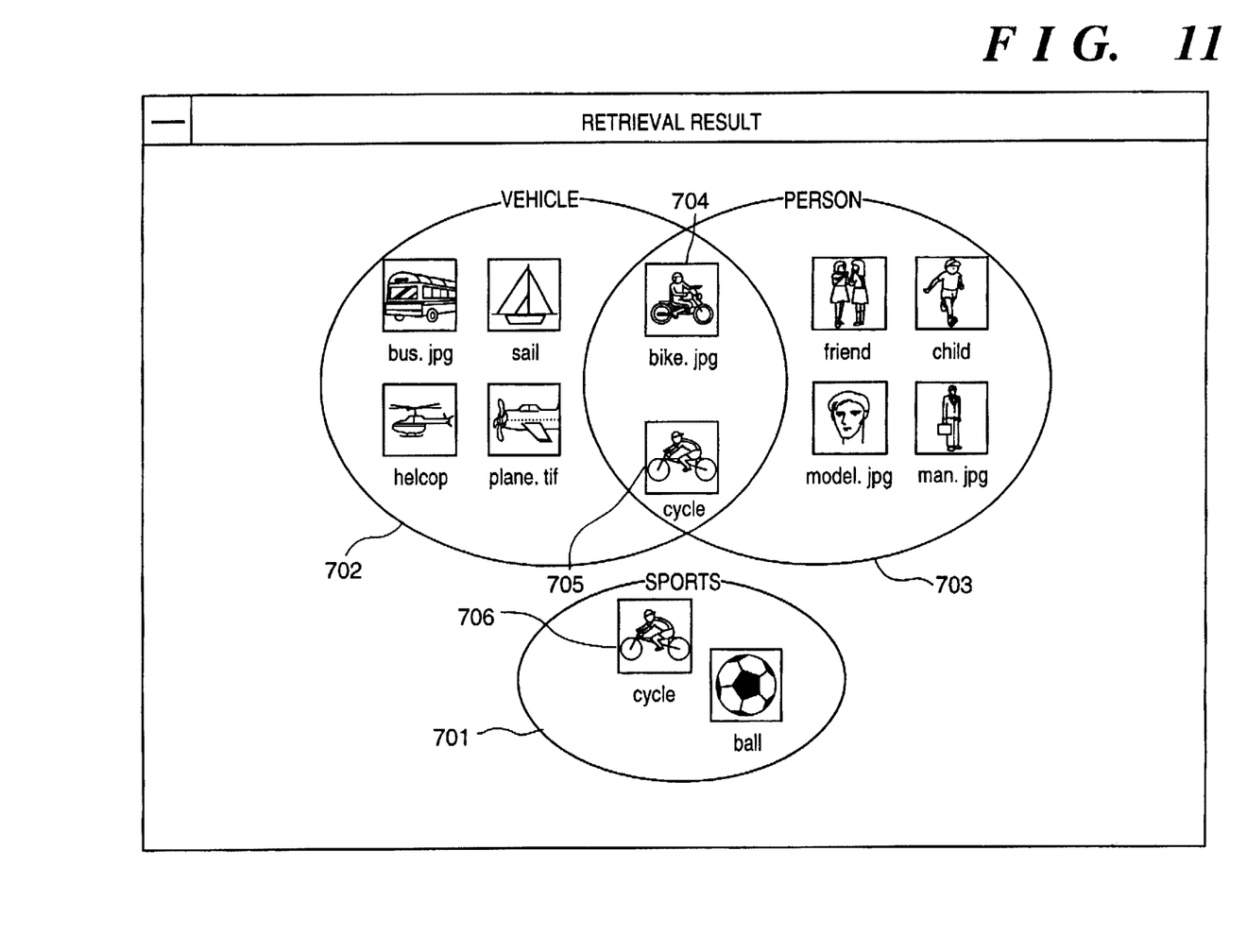
FIG. 11 is a display example according to the second embodiment, where retrieval-result display areas overlap with each other, and another retrieval-result display area is closer to these areas than in FIG. 10.

A retrieval is first performed on one condition (e.g., "data size: 1 MB or greater" (1002 in FIG. 12)), and thereafter, another retrieval is performed on another condition (e.g., "compressed" (1003 in FIG. 12)), and the retrieval results are displayed on a display as shown in FIG. 12. In order to retrieve an item of data that satisfies both conditions ("data size: 1 MB or greater" and "compressed " (1001 in FIG. 12)), these conditions are again designated for a further retrieval, and the result of the retrieval is newly displayed as shown in FIG. 11, although items of data that satisfy any of the two conditions are already retrieved and displayed as 1002 and 1003. This prolongs retrieval time, and enlarges the display area for displaying the same items of data in different display areas.

SUMMARY OF THE INVENTION

The present invention has been made in consideration of the above situation, and has as its object to provide a data retrieval method and apparatus which enable retrieval of items of data that satisfy a plurality of retrieval conditions, by using already-retrieved results, and which also enables data retrieval performable with simple operation, while reducing retrieval time and display area, and storage medium holding programs for executing the method.

Another object of the present invention is to provide a data retrieval method and apparatus which enable retrieval of items of data that satisfy a plurality of retrieval conditions, simply by moving a display area, in which already-retrieved results are displayed, and a storage medium holding programs for executing the method.

Another object of the present invention is to provide a data retrieval method and apparatus which allow ease visual confirmation of items of data that simultaneously satisfy a plurality of retrieval conditions, and to easily visually-confirm items of data that satisfy only one of the plurality of retrieval conditions, and a storage medium holding programs for executing the method.

Another object of the present invention is to provide a data retrieval method and apparatus which, upon retrieval of items of data that satisfy a plurality of retrieval conditions, enable retrieval from only already-retrieved data, without setting the retrieval conditions and searching all the data again, and a storage medium holding programs for executing the method.

Another object of the present invention is to provide a data retrieval method and apparatus which reduce retrieval time and which enable retrieval without re-inputting retrieval condition(s), thus retrieving an operator's labor and improving operability, and a storage medium holding programs for executing the method.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
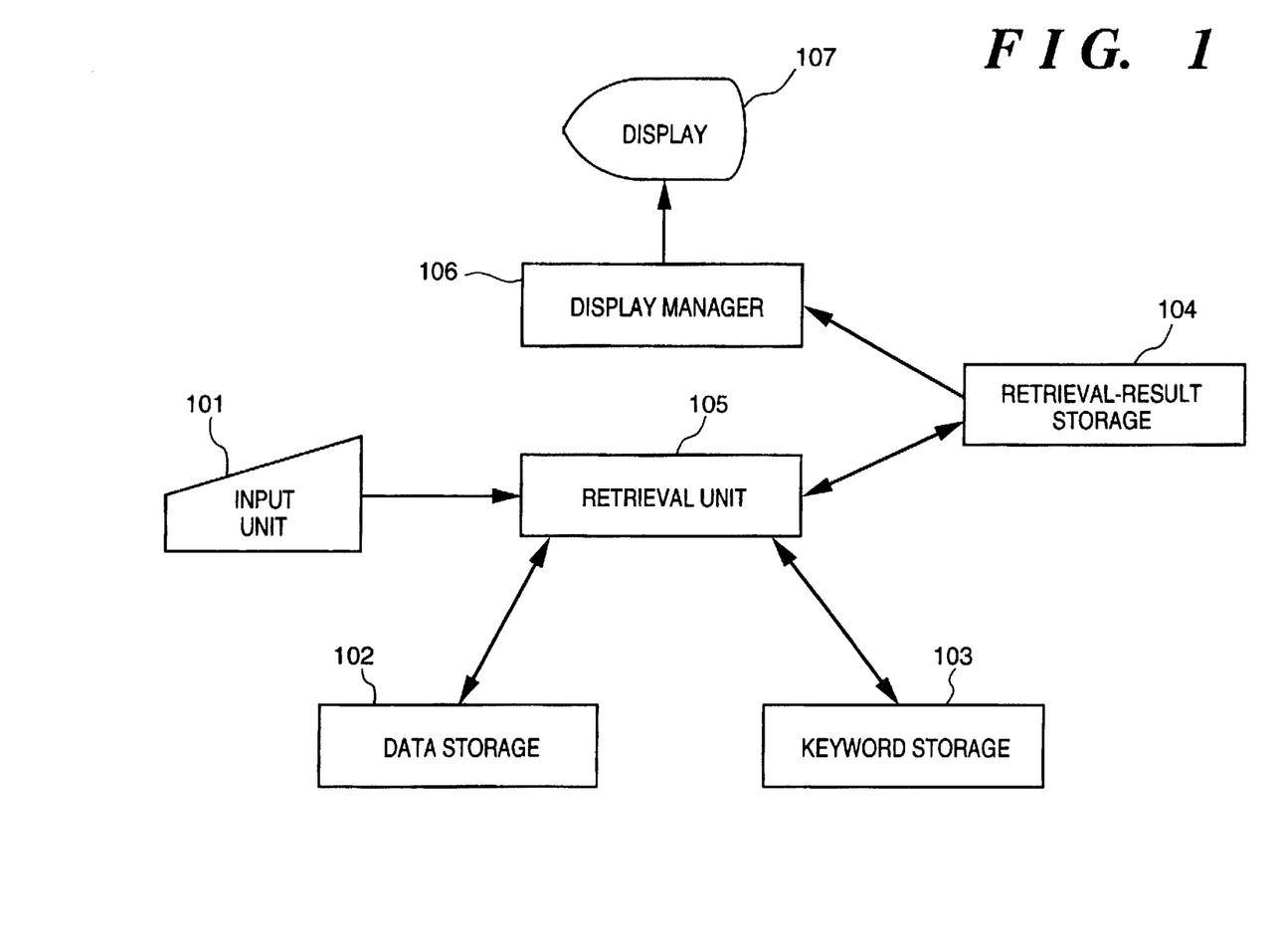
FIG. 1 is a block diagram showing a functional construction of a data retrieval apparatus according to an embodiment of the present invention.

FIG. 1 is a block diagram showing the functional construction of a data retrieval apparatus according to an embodiment of the present invention.

In FIG. 1, numeral 101 denotes an input unit operated by a user. The input unit 101 includes a mouse, a keyboard and the like, for receiving various operations and inputting various commands. Numeral 102 denotes a data storage, including a memory such as a RAM, a hard disk, a magnet-optical disk and the like, for storing data to be processed or managed. Numeral 103 denotes a keyword storage for storing keywords to be added to data for the purpose of assisting data retrieval and representing contents of data, and for storing data implicating the relation between the data stored in the data storage 102 and the keyword added to the data. Note that the keywords are added to the data by a user. Numeral 104 denotes a retrieval-result storage for storing, as retrieval results, keywords used in retrieval and data retrieved with the keywords in correspondence with each other. Numeral 105 denotes a retrieval unit which refers to the keyword storage 103 and the data storage 102, to retrieve data with a keyword designated by the user, and stores the retrieved data into the retrieval-result storage 104. Numeral 107 denotes a display such as a CRT display device. Numeral 106 denotes a display manager which displays the keyword and the data stored in the retrieval-result storage 104 at a predetermined position on the display 107, by using a predetermined user interface.

Figure 2:
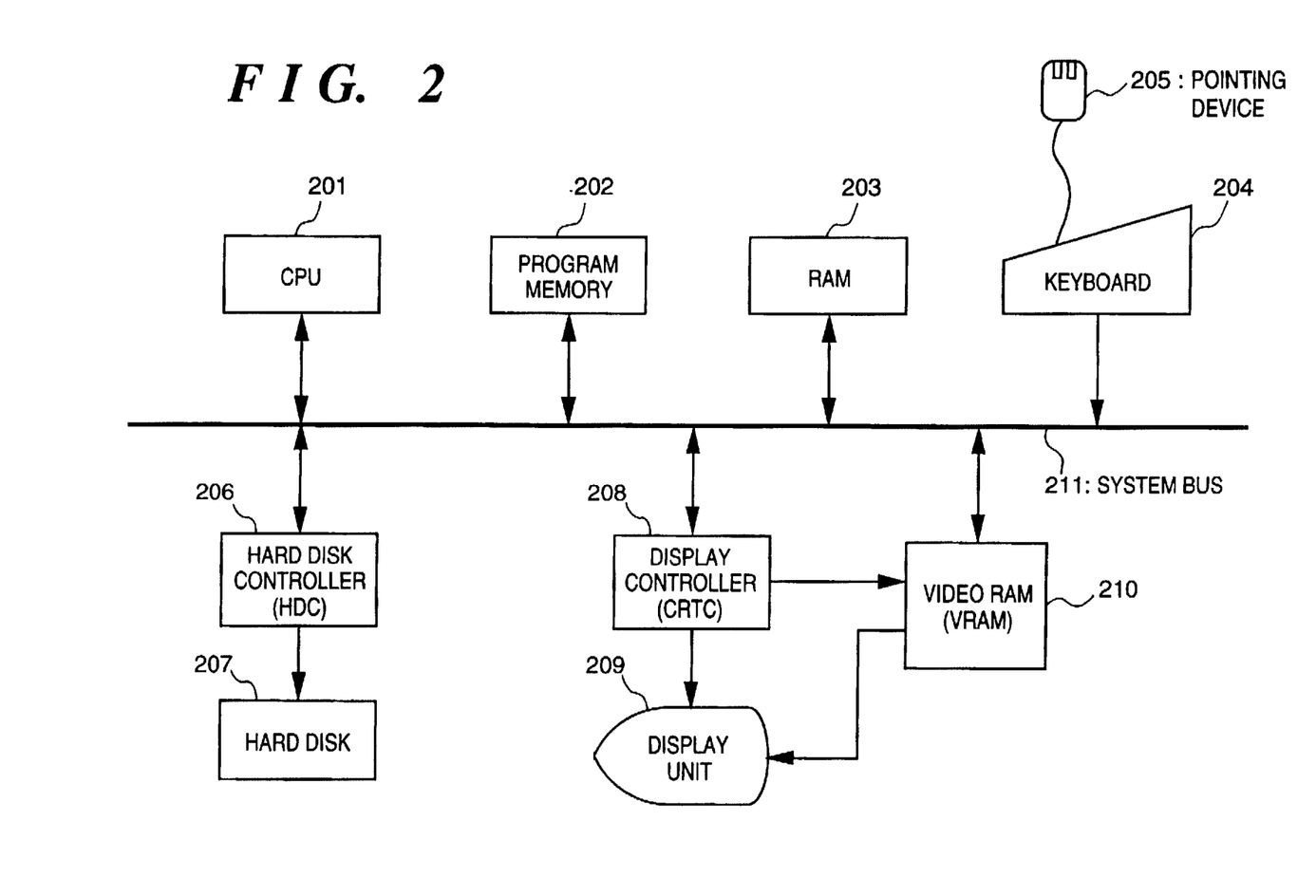
FIG. 2 is a block diagram schematically showing a construction of the data retrieval apparatus according to this embodiment.

FIG. 2 is a block diagram schematically showing the construction of the data retrieval apparatus according to the present embodiment.

In FIG. 2, numeral 201 denotes a CPU for controlling the overall apparatus. The CPU 201 controls various operations in accordance with control programs stored in a program memory 202. Numeral 203 denotes a RAM which is used in execution of control by the CPU 201 as a work memory for temporarily storing various data. Further, the RAM 203 functions as the data storage 102, the keyword storage 103, and the retrieval-result storage 104 in FIG. 1. Numeral 204 denotes a keyboard, and 205, a pointing device such as a mouse, both functioning as the input unit 101 in FIG. 1. Numeral 207 denotes a hard disk which is used for storing/reading various data, under the control of a hard disk controller (HDC) 206. The hard disk 207 functions as the data storage 102, the keyword storage 103 and the retrieval-result storage 104 in FIG. 1. Numeral 209 denotes a display unit such as a CRT or liquid crystal display, which displays messages to the operator, retrieval result(s) and the like, under the control of a display controller (CRTC) 208. Numeral 210 denotes a video RAM (VRAM) for storing image data to be displayed on the display unit 209. The display unit 209 and the VRAM 210 function as the display 107 in FIG. 1. The display controller 208 and the CPU 201 function as the display manager 106 in FIG. 1. Note that the retrieval unit 105 is implemented with the CPU 201 and control programs stored in the program memory 202 by the CPU 201. Numeral 211 denotes a system bus which connects the above-described respective elements.

Figure 3:
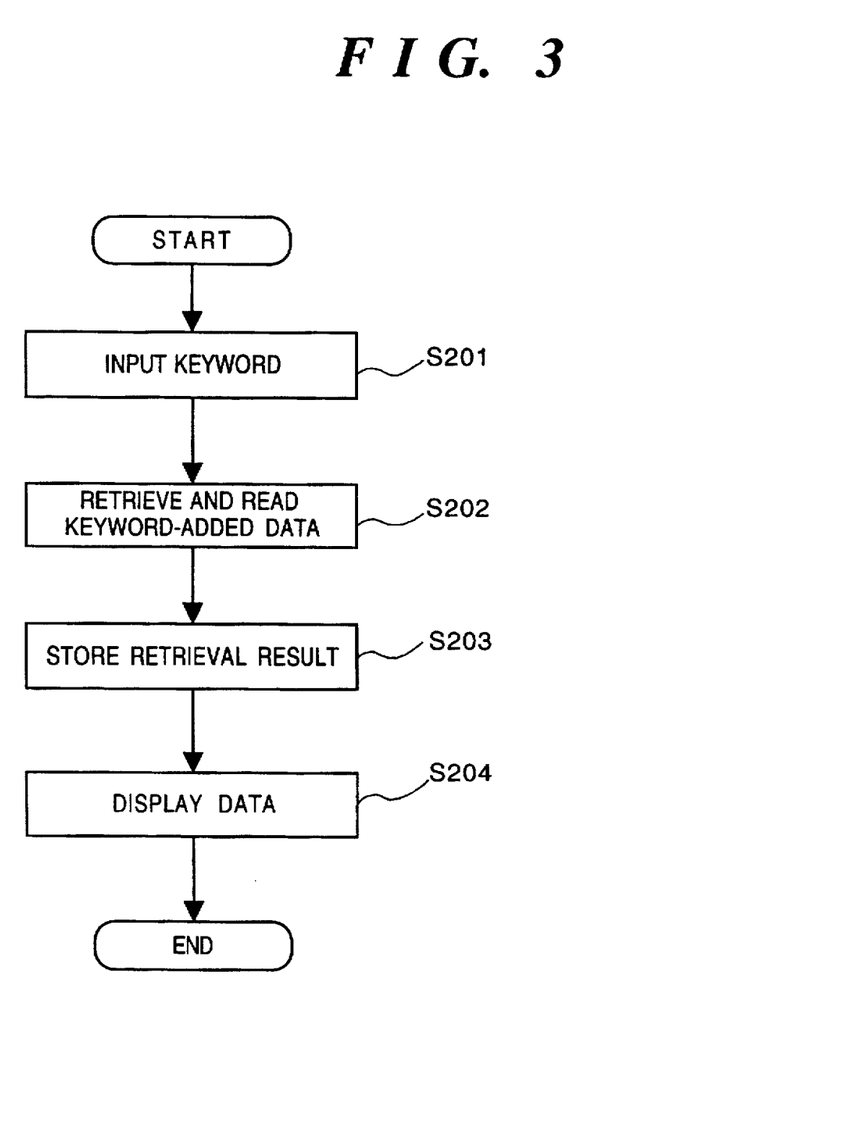
FIG. 3 is a flowchart showing retrieval processing in the data retrieval apparatus according to this embodiment.

Next, retrieval processing for retrieving data with keyword, which is stored in, e.g., the hard disk 207, and displaying the retrieved data will be described with reference to the flowchart of FIG. 3. Note that a control program for this processing is stored in the program memory 202 and executed under the control of the CPU 201.

At step S201, as the user inputs a keyword from the keyboard 204, the keyword is stored into the RAM 203. Then, as data retrieval is instructed by using the keyboard 204 or the mouse 205, the process proceeds to step S202, at which the keyword stored in the RAM 203 is referred to, and items of data with the same keyword as the input keyword, stored in the hard disk 207, are searched for. The process proceeds to step S203, at which the searched data items are read out of the hard disk 207, and the keyword used in the retrieval and the retrieved data item(s) are stored, in correspondence with each other, into the RAM 203. The process proceeds to step S204, at which the keyword, used in the retrieval then stored in the RAM 203, and the items of data with the keyword are displayed at a predetermined area on a display screen of the display unit 209, by using a predetermined user interface.

For example, a keyword "flower" is inputted at step S201, the keyword "flower" is referred to at step S202, and items of data with the keyword "flower" in the hard disk 207 are searched for. Then, the matching item(s) of data is read out of the hard disk 207. At step S203, the keyword "flower" and the retrieved data items are stored into the RAM 203. Thus, the keyword "flower" and the corresponding data items, stored in the RAM 203, are displayed at a predetermined area on the display screen, by using the predetermined user interface.

Figure 4:
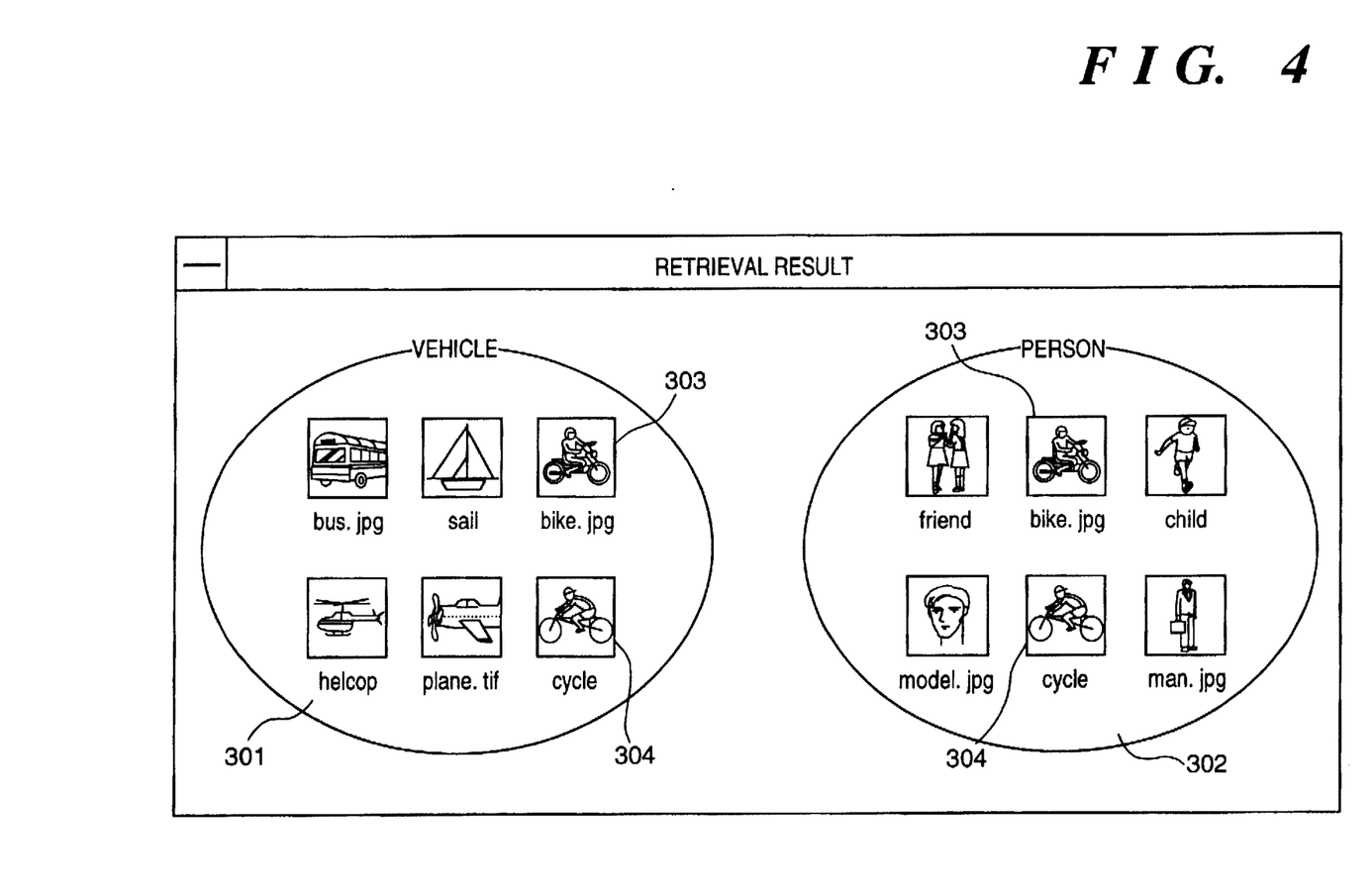
FIG. 4 is a display example of retrieval result in the data retrieval apparatus according to this embodiment.

FIG. 4 is a display example of retrieval result where keywords and items of data (icons of data) retrieved based on the keywords are displayed in correspondence with each other, on a display window of the display unit 209. In FIG. 4, the user interface takes the form of a Venn diagram which is generally used for representing the concept of relations between a plurality of subsets in some set. In FIG. 4, two retrieval results are displayed as two subsets in a set, i.e., a display window of retrieval result.

In FIG. 4, numeral 301 denotes a display area for icons of data retrieved with a keyword "vehicle" (hereinafter this area will be referred to as "retrieval-result display area"); and 302, a retrieval-result display area for icons of data retrieved with a keyword "person". Note that in FIG. 4, as an icon 303 having a data name "bike.jpg" and an icon 304 having a data name "cycle" both represent data with the keywords "vehicle" and "person" (the icons represent a rider and a cycle racer), these icons are displayed in both retrieval-result display areas 301 and 302.

In the present embodiment, the user can designate the retrieval-result display areas 301 and 302 with the mouse 205 and the like to move freely on the display window. The user can designate to instruct retrieve items of data commonly included the plural subsets of retrieval results, by moving one retrieval-result display area to overlap with the other retrieval-result display area. The processing of moving retrieval-result display area according to the embodiment will be described with reference to the flowchart of FIG. 5.

Figure 5:
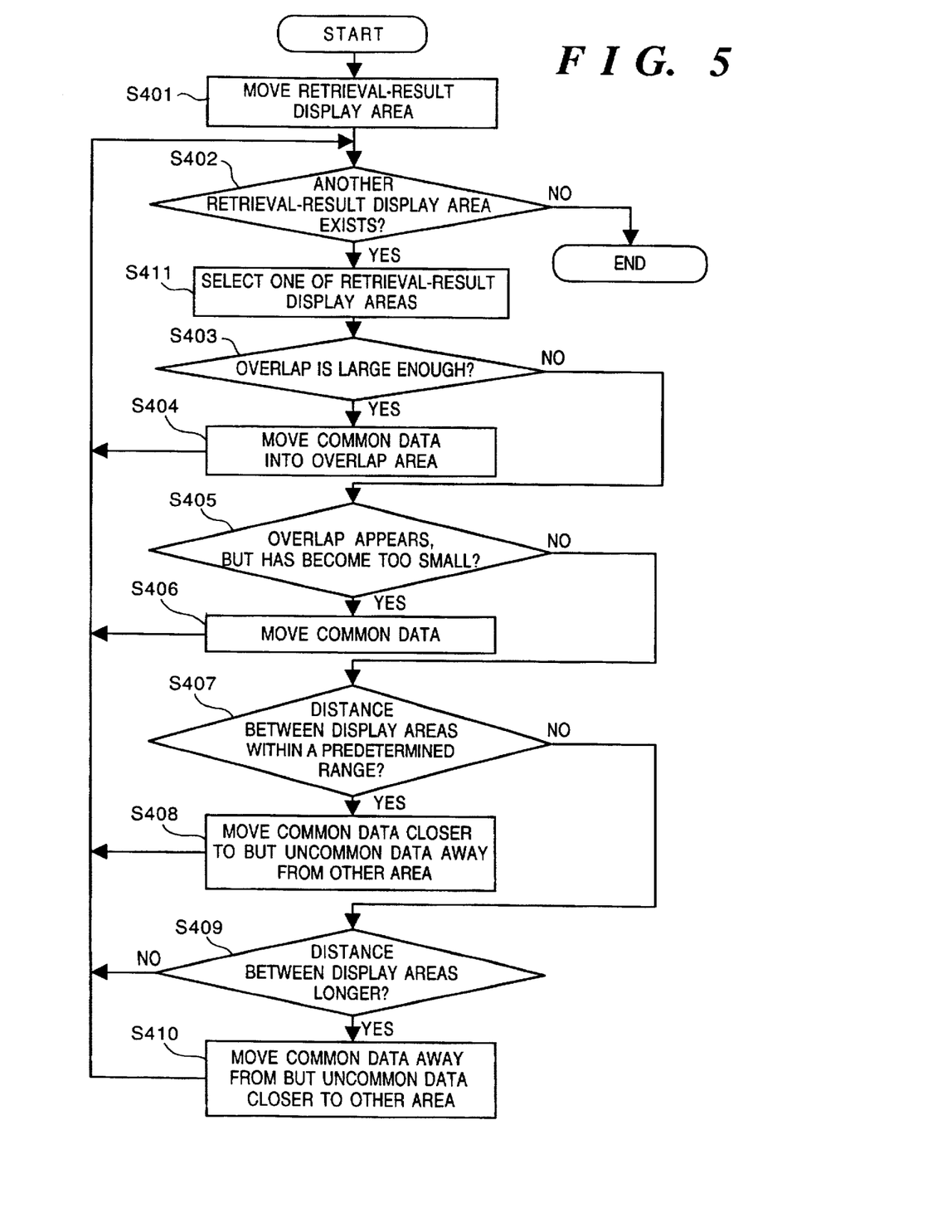
FIG. 5 is a flowchart showing processing of moving retrieval-result display area in the data retrieval apparatus according to this embodiment.

At step S401, when a user selects a desired retrieval-result display area displayed on the display unit 209, e.g., the user clicks with the mouse 205 or the like, and moves the retrieval-result display area (e.g., 301 in FIG. 4) displayed on the display unit 209 by operation using the mouse 205, the retrieval-result display area (301) is displayed as being moved on the display window of the display unit 209, in accordance with a movement amount indicated by a mouse cursor or the like. Next, at step S402, whether or not another retrieval-result display area exists on the display window of the display unit 209 is examined. If NO, the process ends, while if YES, the process proceeds to step S411, at which one of the retrieval-result display areas is selected as an objective retrieval-result display area (objective area). The selection of the objective area is made automatically so as to process the objective area with correlation between the selected retrieval-result display area (S401) and the objective area in after steps. At the subsequent steps, whether or not a predetermined condition is satisfied is examined with respect to the selected retrieval-result display areas.

At step S403, with respect to the retrieval-result display area selected at step S411 and the retrieval-result display area moved at step S401, whether or not condition "overlap between the areas appears, and the overlap are is large enough to include items of data commonly included in both retrieval-result display areas" is satisfied is examined by referring to information stored in the retrieval-result storage 104. If it is determined that this condition is satisfied, the process proceeds to step S404, at which icons of items of data commonly included in the both retrieval-result display areas are moved into the overlap area between these areas and displayed there. Note that at this time, each of the icons of the items of data commonly-included in these areas is only displayed in the overlap area as one icon as shown in FIG. 6.

Figure 6:
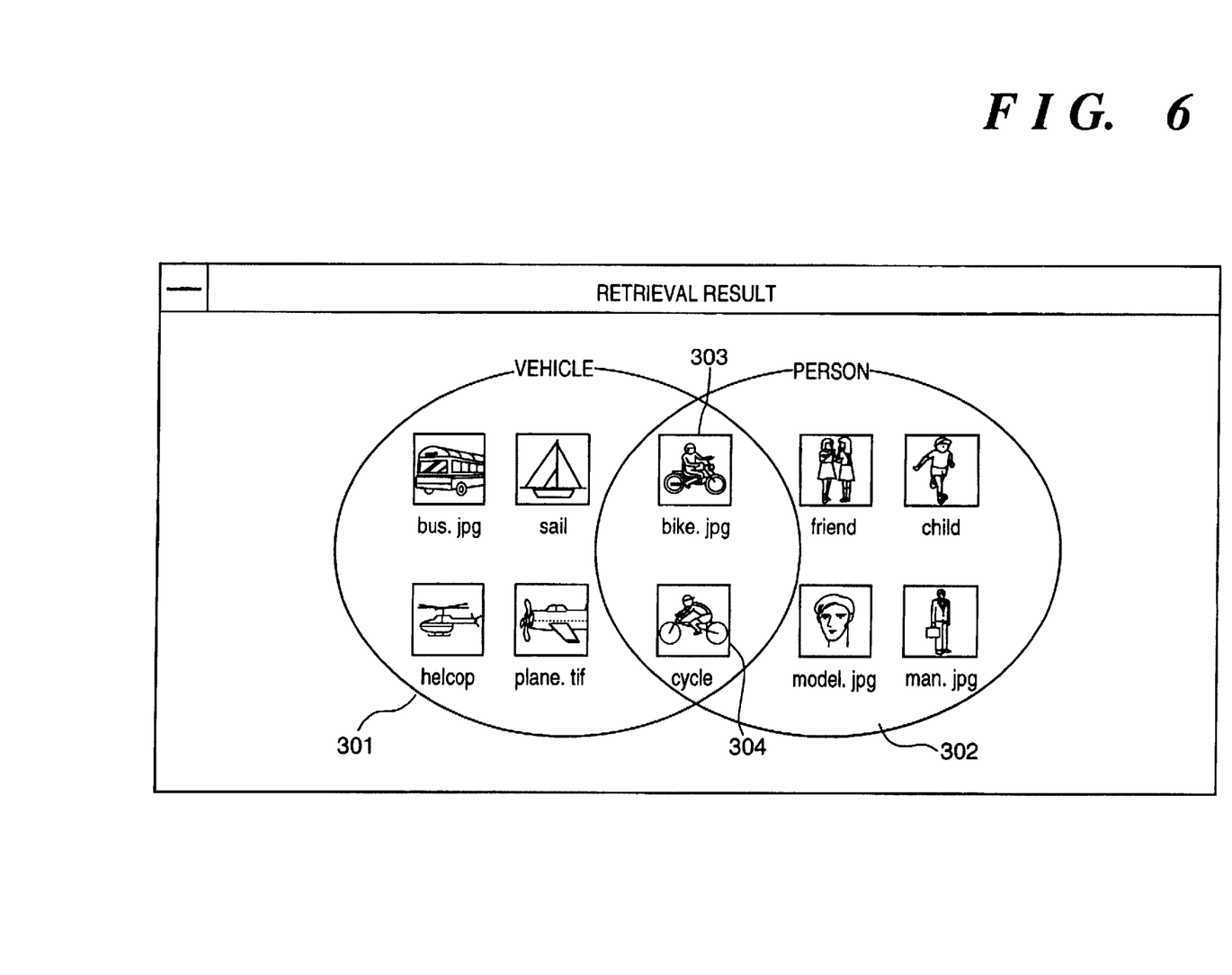
FIG. 6 is a display example according to this embodiment, where retrieval-result display areas are overlapped.

This operation will be more specifically described by using an example in FIGS. 4 and 6. When the retrieval-result display area 301 is moved in the right direction to overlap with the retrieval-result display area 302, if an overlap area 501 is large enough to include the icon 303 with the data name "bike.jpg" and the icon 304 with the data name "cycle", these two icons 303 and 304 are moved into the overlap area 501 and displayed, respectively as the sole icon, as shown in FIG. 6.

Thus, after the processing at step S404 has been performed, the process returns to step S402, at which whether or not another retrieval-result display area exists, is examined. If YES, the processing from step S411 and the subsequent steps is performed, while if NO, the process ends.

On the other hand, if it is determined in step S403 that the moving condition is not satisfied, i.e., if an overlap area is not large enough to include icons, the process proceeds to step S405. At step S405, with respect to the retrieval-result display area selected in step S411, and the retrieval-result display area moved in step S401, it is determined whether or not the condition "the overlap area has become too small to include icon(s) commonly included in the both retrieval-result display areas" is satisfied. If it is determined that this condition is satisfied, the process proceeds to step S406, in which the icon(s) included in the overlap area and is removed from the overlapped area, instead, each of the icons commonly included in the both areas is displayed in each of the retrieval-result display areas. The positions in the respective retrieval-result display areas at which the icons are displayed are near the overlapped area (e.g., the overlap area 501 in FIG. 6), as shown in FIG. 7.

Figure 7:
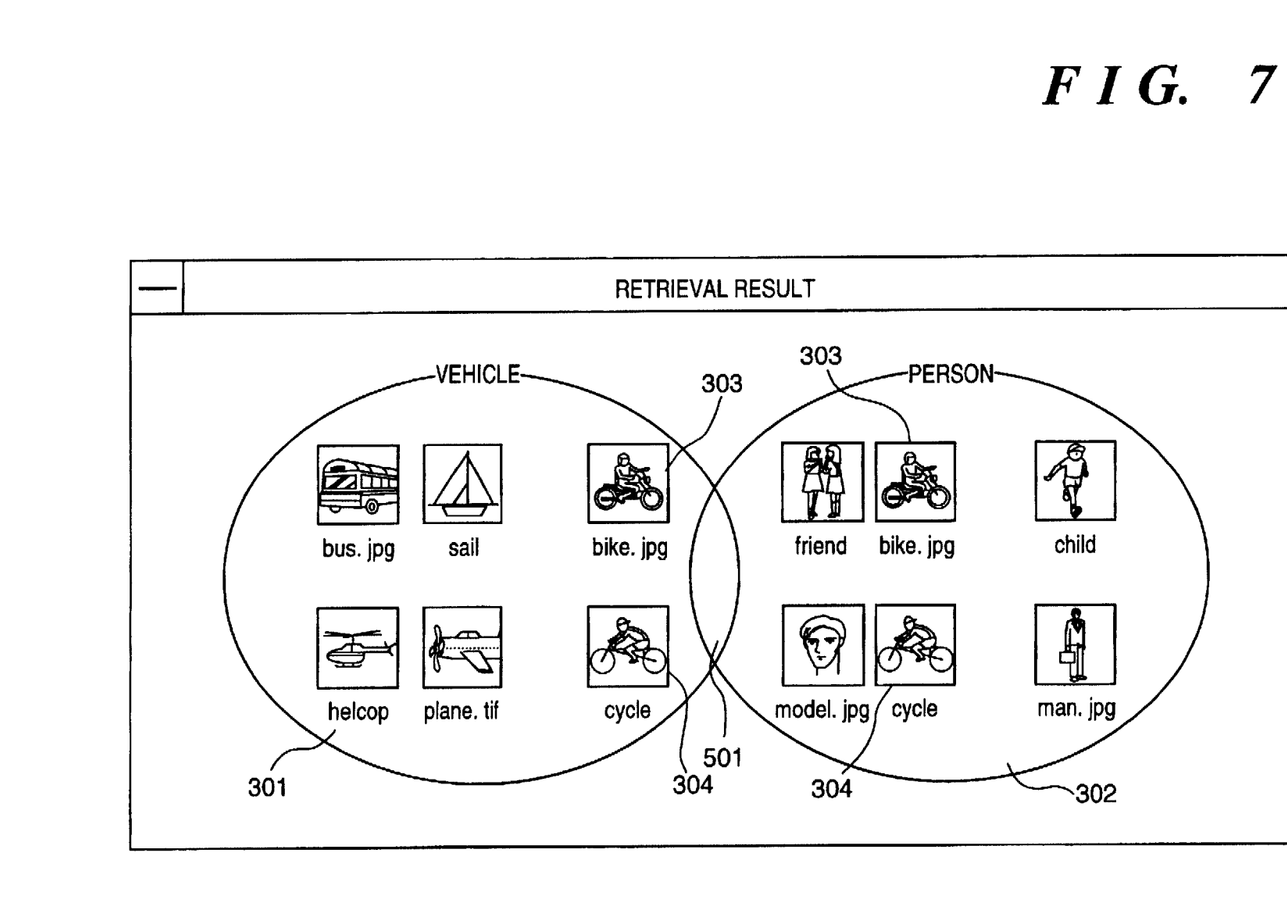
FIG. 7 is a display example according to this embodiment, where retrieval-result display areas are overlapped but the overlap area is too small.

This corresponds to a case where the state in FIG. 6 changes to that in FIG. 7. That is, as the overlap area 501 becomes smaller due to moving of the retrieval-result display area 301 leftward, as shown in FIG. 7, the icons 303 and 304 which have been displayed in the overlap area 501 are respectively displayed in the retrieval-result display areas 301 and 302. After the processing in step S406 has been performed, the process returns to step S402, in which whether or not another retrieval-result display area exists, is examined. If YES, the processing in step S411 and the subsequent steps is performed, while if NO, the process ends.

If it is determined in step S405 that the condition is not satisfied, i.e., the retrieval-result display areas are not overlapped with each other, the process proceeds to step S407. At step S407, with respect to the retrieval-result display area selected at step S411, and the retrieval-result display area moved in step S401, whether or not a condition "the distance between these retrieval-result display areas has come to be within a predetermined range" is satisfied, is examined. The distance between the two retrieval-result display areas can be measured by, e.g., measuring the distance between predetermined points in the respective retrieval-result display areas. If it is determined that the condition is satisfied, the process proceeds to step S408, at which the retrieval-result storage 104 is referred to, and the icon(s) commonly included in the both retrieval-result display areas is moved, in each display area, closer to the opposite retrieval-result display area by a slight distance, while the other icon(s) not commonly included in the both retrieval-result display areas is moved, in each display area, away from the opposite retrieval-result display area by a slight distance. Note that if the areas are moved close to each other and are overlapped and there is not sufficient space in the overlap area to display the common icon(s), the common icon(s) is not moved into the overlap area.

Figure 8:
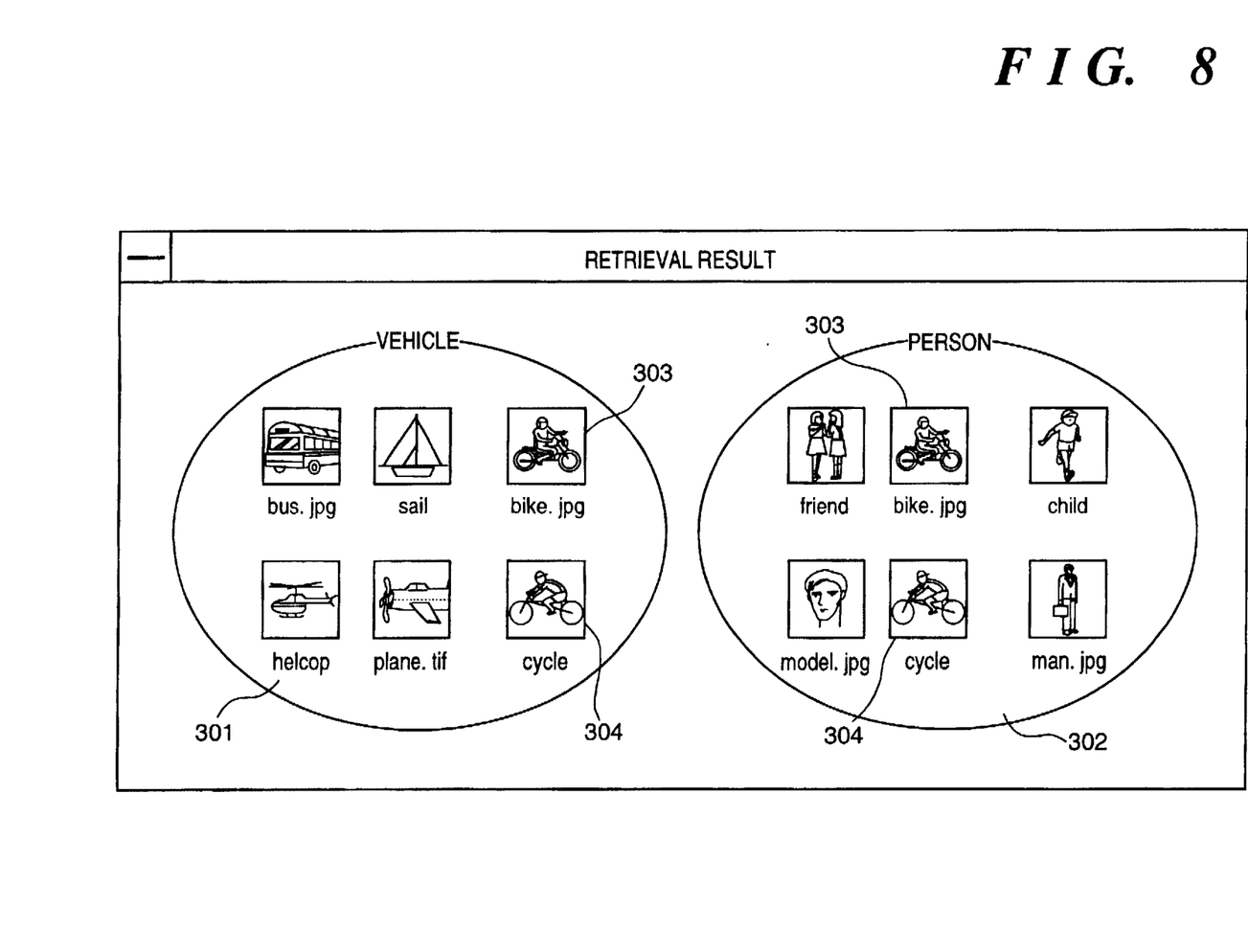
FIG. 8 is a display example according to this embodiment, where retrieval-result display areas are closer to each other than in FIG. 4.

This operation will be more specifically described in the case of retrieval in FIG. 4. If the retrieval-result display area 301 is moved closer to the retrieval-result display area 302, the icon 303 with the data name "bike.jpg" commonly included in both retrieval-result display areas 301 and 302, and the icon 304 with the data name "cycle" also common to both areas 301 and 302, are moved closer to each other, and the other icons are moved away from the opposite area, as shown in FIG. 8. Further, the above operation is also made in a case where the overlap area between the retrieval-result display areas becomes closer, but the overlap area is too small to satisfy the condition in step S403. After the processing in step S408 has been performed, the process returns to step S402, at which whether or not another retrieval-result display area exists, is examined. If YES, the processing from step S411 and the subsequent steps is performed, while if NO, the process ends.

If it is determined in step S407 that the condition is not satisfied, i.e., the distance between the retrieval-result display areas has not come to be within the predetermined range, the process proceeds to step S409. In step S409, with respect to the retrieval-result display area selected in step S411, and the retrieval-result display area moved in step S401, whether or not a condition "the distance between these retrieval-result display areas has become longer" is satisfied, is examined. The distance can be measured in, e.g., the same way as described with regard to step S407. If it is determined that the condition is satisfied, the process proceeds to step S410, in which the retrieval result(s) in the RAM 203 is referred to, and the icon(s) commonly included in the both retrieval-result display areas is moved, in each display area, away from the opposite retrieval-result display area by a slight distance, while the other icon(s) not commonly included in the both retrieval-result display areas is moved, in each display area, closer to the opposite retrieval-result display area by a slight distance.

This corresponds to a case where the state in FIG. 8 changes to that in FIG. 4. That is, from the state as shown in FIG. 8, icons which do not contain common data in the retrieval-result display areas 301 are moved closer to the retrieval-result display area 302, by moving the retrieval-result display area 301 leftward.

The icons 303 and 304, corresponding to each other, are moved away from each other by slight distance, respectively in the retrieval-result display areas 301 and 302. After the processing in step S410 has been performed, or if it is determined in step S409 that the condition is not satisfied, the process returns to step S402, in which whether or not another retrieval-result display area exists is examined. If YES, the processing from step S411 and the subsequent steps is performed, while if NO, the process ends.

<Other Embodiments>

Note that in the foregoing embodiment, for the purpose of simplification of explanation, the operation to move retrieval-result display area(s) has been described in a case where the number of retrieval-result display areas is two. However, this operation can be applied to a case where the number of retrieval-result display areas is more than two. This is apparent from the processing as shown in the flowchart of FIG. 5 where if there are a plurality of retrieval-result display areas, one of the retrieval-result display areas is selected (step S411), and whether or not the condition is satisfied is examined with respect to the selected retrieval-result display area (steps S403, S405, S407 and S409). For example, if there are three retrieval-result display areas and one of them is moved, the movement is made through the process as shown in FIG. 9.

Figure 9:
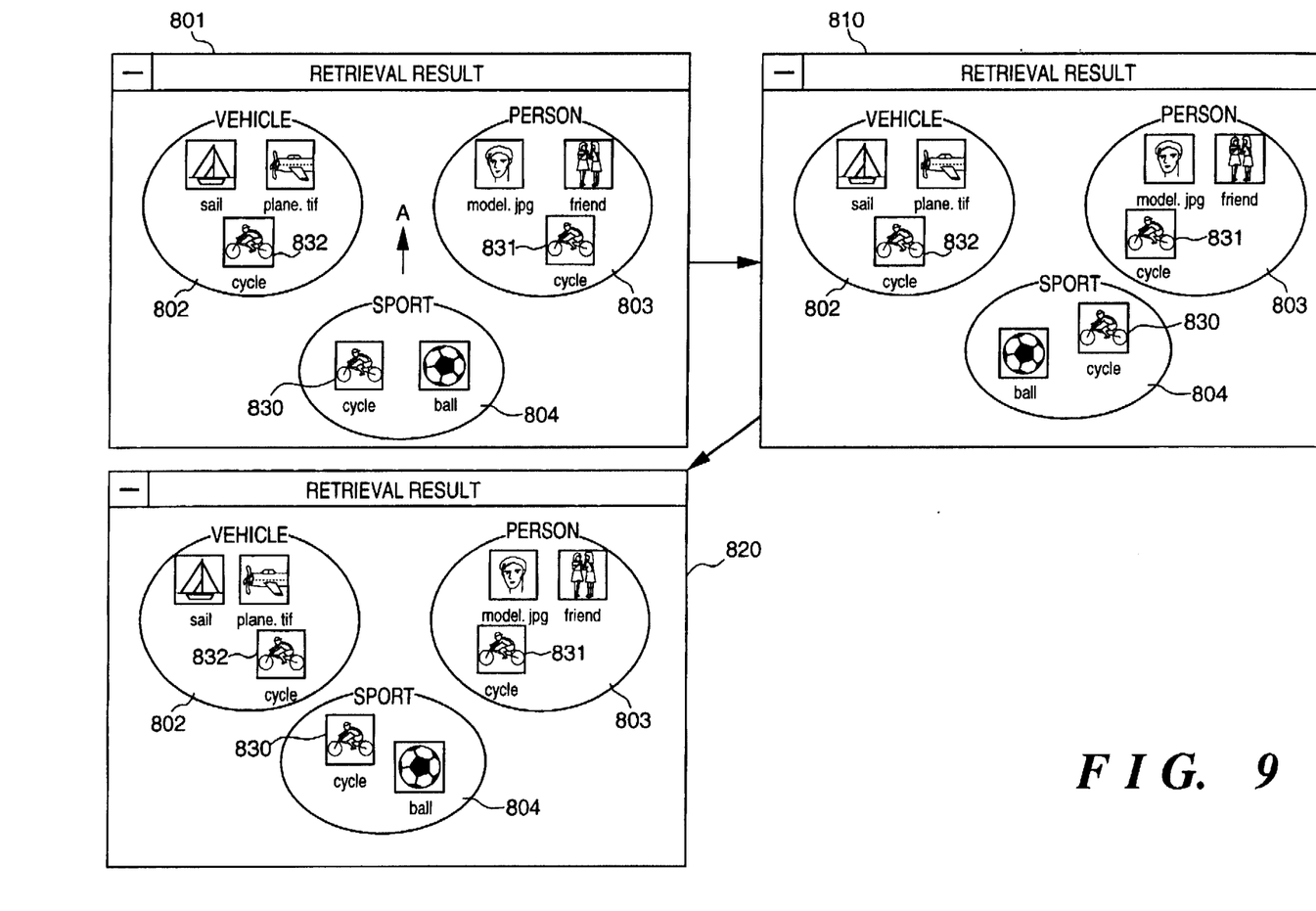
FIG. 9 is a display example according to another embodiment, where one of a plurality of retrieval results is moved.

FIG. 9 is a display example where three retrieval-result display areas based on each retrieval result are displayed, and these retrieval results include common data (icon).

In FIG. 9, numeral 801 denotes a display window of the result of retrieval based on keywords "vehicle", "person" and "sport", in which the retrieval-result display areas 802 to 804 are not moved yet. From this state, the retrieval-result display area 804 is selected and moved in the arrow A direction by, e.g., a dragging operation. Then, whether or not the aforementioned condition is satisfied, i.e., the distance between the two retrieval-result display areas 803 and 804 has become within a predetermined range, is examined with respect to e.g. the retrieval-result display area 803. When the distance between the retrieval-result display areas 803 and 804 come to be within the predetermined range, icons 830 and 831 having a common data name ("cycle") are moved closer to each other, as shown in a display window 810. Next, whether or not the aforementioned condition is satisfied is examined with respect to another retrieval-result display area 802. If it is determined that the condition is satisfied, an icon 832 having the data name "cycle" in the retrieval-result display area 802 and an icon 832 also having the data name "cycle" in the retrieval-result display area 803 are moved closer to each other, as shown in a display window 820.

In these embodiments, the plurality of retrieval-result display areas do not overlap at first, but, even if they overlap with each other from the beginning, these areas can be handled in a similar manner.

Figure 10:
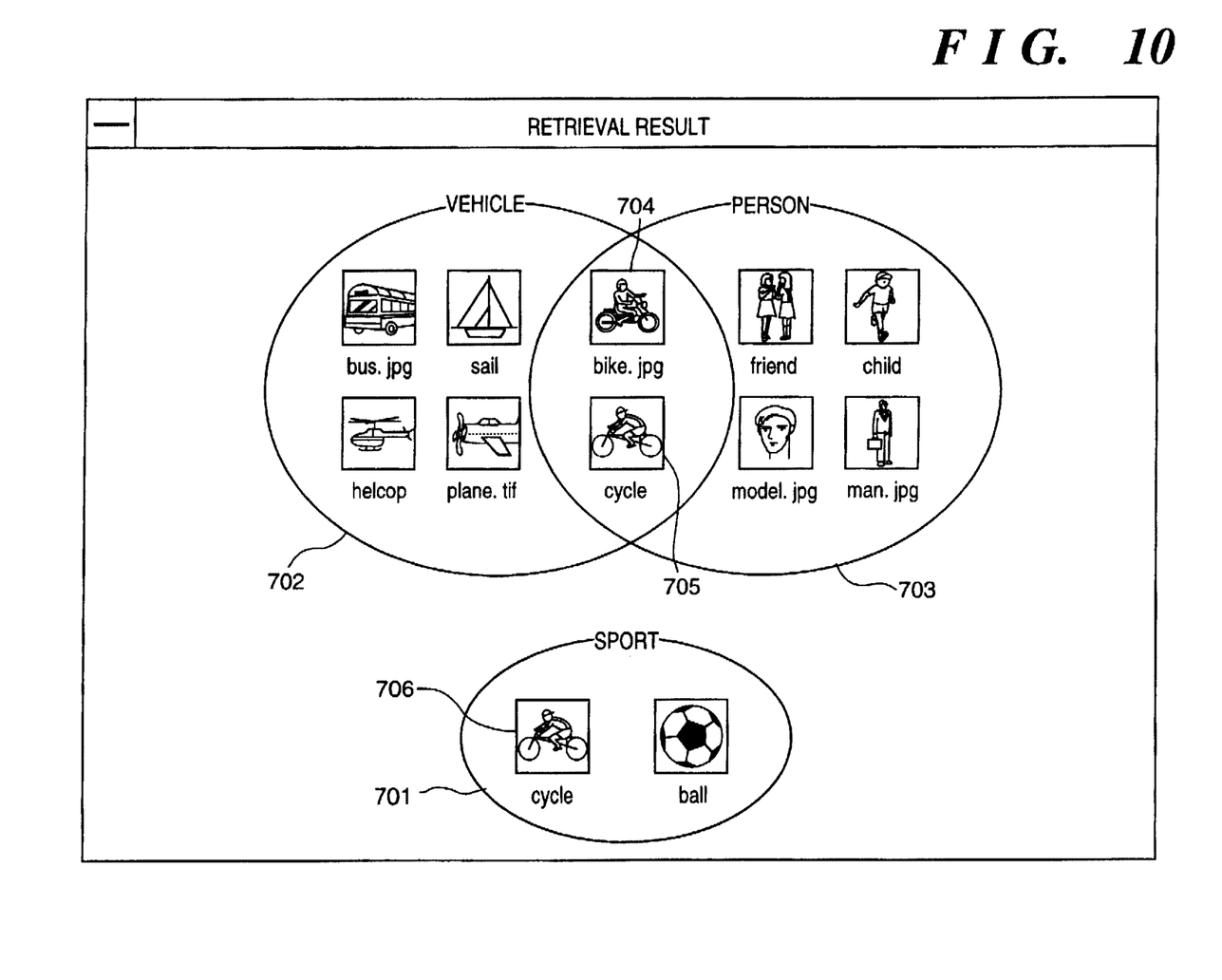
FIG. 10 is a display example according to the second embodiment, where retrieval-result display areas overlap with each other, and another retrieval-result display area is close to these areas.

Next, in a display window of retrieval result as shown in FIG. 10, for example, the operation for when a retrieval-result display area 701 is moved upward will be described by using the flowchart of FIG. 5.

First, in step S401, the retrieval-result display area 701 is designated and moved upward on the display window of the display unit 209. Next, in step S402, with respect to three display areas, a retrieval-result display area 702 including icons of data with only one keyword "vehicle", a retrieval-result display area 703 including icons of data with only one keyword "person", and an overlap area 704 including icons of data with both keywords "vehicle" and "person", as the object areas of processing, whether or not the conditions from step S403 and the subsequent steps are satisfied, is examined.

As shown in FIG. 11, as the distance between the retrieval-result display area 701 and the retrieval-result display area 703 becomes within a predetermined range, only an icon 705 of data with the data name "cycle" in the retrieval-result display area 703 (or 704) and an icon 706 of data with the data name "cycle" in the retrieval-result display area 701 are moved closer to each other. On the other hand, other data icons in the retrieval-result display areas 703 and 701 are moved away from the opposite side.

The present invention can be applied to a system constituted by a plurality of devices (e.g., host computer, interface, reader, printer) or to an apparatus comprising a single device (e.g., copy machine, facsimile).

Further, the objects of the present invention can also be achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, storage media, such as a floppy disk, a hard disk, an optical disk, a magneto-optical disk, CD-ROM, CD-R, a magnetic tape, a non-volatile type memory card, and a ROM can be used for providing the program codes.

Furthermore, in addition to aforesaid functions according to the above embodiments are realized by executing the program codes which being read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 13A:
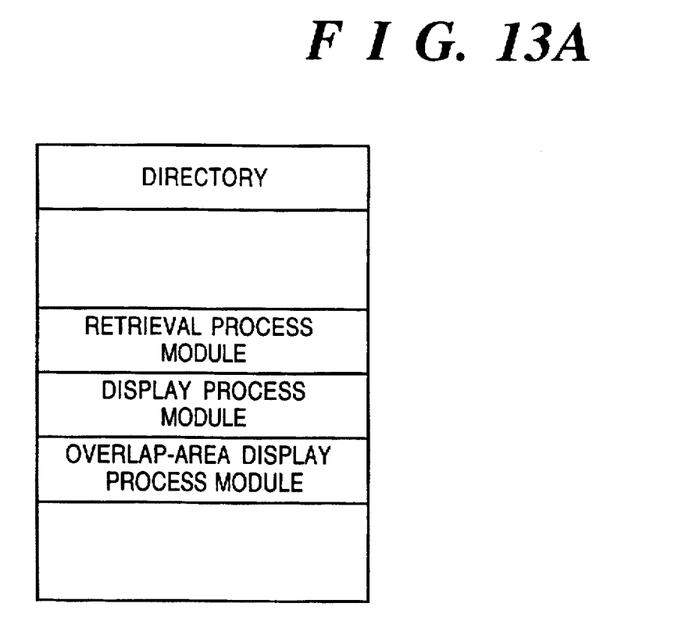
FIGS. 13A and 13B are memory maps of a computer-readable storage medium holding a program of the present invention.
Figure 13B:
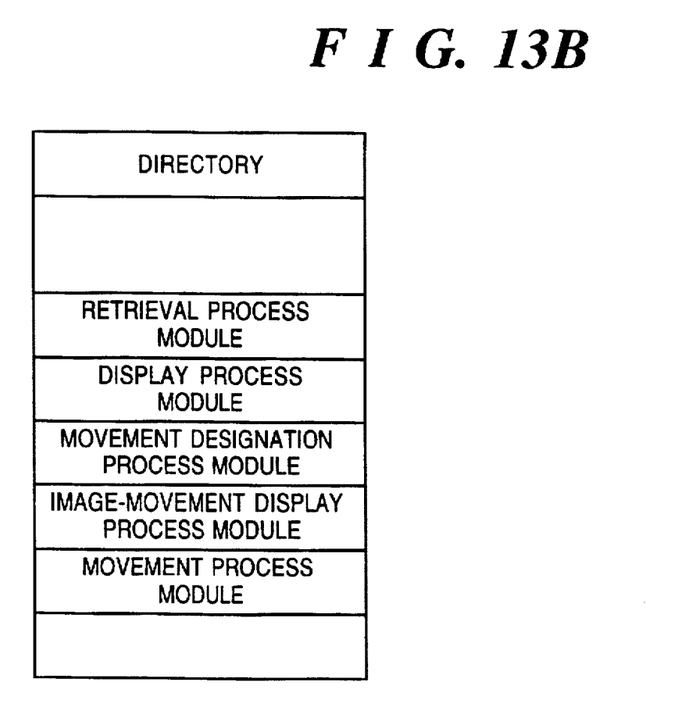

In a case where the present invention is applied to the aforesaid storage medium, the storage medium stores program codes corresponding to the flowcharts described in the embodiments. Briefly, the storage medium stores each module shown as the example of memory map in FIG. 13A. More specifically, program codes which correspond to retrieval process module, display process module, and overlap-area display process module, at least, are to be stored in the storage medium. Further, as shown in the example of memory map in FIG. 13B, program codes which correspond to the retrieval process module, display process module, movement designation process module, image-movement display process module, and movement process module, at least, are to be stored in the storage medium.

In the foregoing embodiments, the icons corresponding to retrieved data are displayed in a retrieval-result display area, however, but the present invention is not limited to this arrangement. Data names, their abbreviated names, common icons with different names and the like, can be replaced with the data icons of these embodiments.

As described above, according to the embodiments, a display area of the result of retrieval based on a retrieval condition is moved on a display window, to overlap with another display area of the result of retrieval based on another retrieval condition, so that icons having the same keyword, commonly included in an overlap area between these display areas can be displayed in the overlap area. Thus, items of data that satisfies a plurality of retrieval conditions can be easily retrieved.

Further, items of data that satisfy a plurality of retrieval conditions can be easily visually-confirmed, and also, items of data that satisfy only one retrieval condition can be easily visually-confirmed.

Further, upon retrieving items of data that satisfy a plurality of retrieval conditions, if some items of data have already been retrieved on one of the conditions, it is not necessary to perform a search on the retrieval conditions on all items of data. As the retrieval can be performed on only the data which have been already retrieved on one of the conditions, time consumption for further retrieval can be reduced. In addition, the retrieval can be made without re-setting the retrieval conditions, thus offloading an operator's labor and improving operability.

Further, according to the embodiments, by moving a retrieval-result display area closer to another display area, an icon of data commonly included in a plurality of retrieval results are moved closer to each other, while icons of data not commonly included in the retrieval-result display areas are moved away from the opposite area. This enables discrimination of data that satisfies a plurality of retrieval conditions without overlapping the retrieval-result display areas.

The present invention is not limited to the above embodiments, and various changes and modifications can be made within the spirit and scope of the present invention. Therefore, to apprise the public of the scope of the present invention, the following claims are made.

What is claimed is:

1. A data retrieval apparatus for retrieving desired data from a plurality of data stored in data storage means, comprising:

retrieval means for retrieving data that satisfies a retrieval condition from said data storage means;

display means for displaying an image, corresponding to the data retrieved by said retrieval means, within an area provided in correspondence with the retrieval condition; and control means for, if said display means displays a plurality of areas in correspondence with retrieval conditions respectively, displaying an image of data that simultaneously satisfies retrieval conditions corresponding to the plurality of areas, within an overlap area between the areas.

2. The data retrieval apparatus according to claim 1, further comprising memory means for storing a retrieval condition and a retrieval result retrieved based on the retrieval conditions by said retrieval means, in correspondence with the areas, wherein if said display means displays the plurality of areas, said control means refers to retrieval conditions corresponding to the plurality of areas, mutually related to each other, and discriminates data that simultaneously satisfies the retrieval conditions of the plurality of areas.

3. The data retrieval apparatus according to claim 1, wherein if said display means displays a plurality of areas and at least one of the plurality of areas is moved on a display screen, said control means moves images of data in the plurality of areas that respectively satisfy only one of retrieval conditions corresponding to the plurality of areas, away from other areas.

4. The data retrieval apparatus according to claim 1, wherein data are stored, in correspondence with keywords, into said data storage means, and wherein the retrieval conditions are inputted as keywords.

5. The data retrieval apparatus according to claim 1, wherein an image of data is an icon corresponding to the data.

6. A data retrieval apparatus for retrieving desired data from a plurality of data stored in data storage means, comprising:

retrieval means for retrieving data that satisfies a retrieval condition from said data storage means;

display means for displaying an image on a display screen, corresponding to the data retrieved by said retrieval means, within an area provided in correspondence with the retrieval condition;

moving means for moving a first area displayed by said display means on the display screen; and control means for, if a distance between the first area moved by said moving means and a second area comes to be within a predetermined range, displaying an image of a data that simultaneously satisfies retrieval conditions corresponding to the first and second areas, at positions within each of the first and second areas, closer to each other.

7. The data retrieval apparatus according to claim 6, further comprising input means for inputting the retrieval condition.

8. The data retrieval apparatus according to claim 6, further comprising memory means for storing a retrieval condition and a retrieval result retrieved based on the retrieval conditions by said retrieval means, in correspondence with the areas, wherein if said display means displays the plurality of areas, said control means refers to retrieval conditions corresponding to the plurality of areas, mutually related to each other, and discriminates data that simultaneously satisfies the retrieval conditions of the plurality of areas.

9. The data retrieval apparatus according to claim 6, wherein if said display means displays a plurality of areas and at least one of the plurality of areas is moved on a display screen, said control means moves images of data in the plurality of areas that respectively satisfy only one of retrieval conditions corresponding to the plurality of areas, away from other areas.

10. The data retrieval apparatus according to claim 6, wherein data are stored, in correspondence with keywords, into said data storage means, and wherein the retrieval conditions are inputted as keywords.

11. The data retrieval apparatus according to claim 6, wherein an image of data is an icon corresponding to the data.

12. A data retrieval method for retrieving desired data from a plurality of data stored in data storage means, comprising:

a retrieval step of retrieving data that satisfies a retrieval condition from said data storage means;

a display step of displaying an image on a display screen, corresponding to the data retrieved in said retrieval step, within an area provided in correspondence with the retrieval condition; and a control step of, if a plurality of areas are displayed in correspondence with retrieval conditions respectively on the display screen, displaying an image of data that simultaneously satisfies the retrieval conditions corresponding to the plurality of areas, in an overlap area between the areas.

13. The data retrieval method according to claim 12, further comprising a memory step of storing a retrieval condition and a retrieval result retrieved based on the retrieval conditions by said retrieval means, in correspondence with the areas, wherein if the plurality of areas are displayed in said display step, retrieval conditions corresponding to the plurality of areas, mutually related to each other, are referred to, and data that simultaneously satisfies the retrieval conditions of the plurality of areas is discriminated, in said control step.

14. The data retrieval method according to claim 12, wherein if a plurality of areas are displayed and at least one of the plurality of areas is moved on a display screen in said display step, images of data in the plurality of areas that respectively satisfy only one of retrieval conditions corresponding to the plurality of areas, are moved away from other areas, in said control step.

15. The data retrieval method according to claim 12, wherein data are stored, in correspondence with keywords, into said data storage means, and wherein the retrieval conditions are inputted as keywords.

16. The data retrieval method according to claim 12, wherein an image of data is an icon corresponding to the data.

17. A data retrieval method for retrieving desired data from a plurality of data stored in data storage means, comprising:

a retrieval step of retrieving data that satisfies a retrieval condition from said data storage means;

a display step of displaying an image on a display screen, corresponding to the data retrieved in said retrieval step, within an area provided in correspondence with the retrieval condition;

a moving step of moving a first area displayed in said display step on the display screen; and a control step of, if a distance between the first area moved in said moving step and a second area comes to be within a predetermined range, displaying an image of data that simultaneously satisfies retrieval conditions corresponding to the first and second areas, at positions in each of the first and second areas, closer to each other.

18. The data retrieval method according to claim 17, further comprising a memory step of storing a retrieval condition and a retrieval result retrieved based on the retrieval conditions by said retrieval means, in correspondence with the areas, wherein if the plurality of areas are displayed in said display step, retrieval conditions corresponding to the plurality of areas, mutually related to each other, are referred to, and data that simultaneously satisfies the retrieval conditions of the plurality of areas is discriminated, in said control step.

19. The data retrieval method according to claim 17, wherein if a plurality of areas are displayed and at least one of the plurality of areas is moved on a display screen in said display step, images of data in the plurality of areas that respectively satisfy only one of retrieval conditions corresponding to the plurality of areas, are moved away from other areas, in said control step.

20. The data retrieval method according to claim 17, wherein data are stored, in correspondence with keywords, into said data storage means, and wherein the retrieval conditions are inputted as keywords.

21. The data retrieval method according to claim 17, wherein an image of data is an icon corresponding to the data.

22. A computer-readable storage medium holding program codes for retrieving a desired data from a plurality of data stored in data storage means, comprising:

a retrieval process module for retrieving a data that satisfies a retrieval condition from said data storage means;

a display process module for displaying an image on a display screen, corresponding to the data retrieved at said retrieval process module, within an area provided in correspondence with the retrieval condition; and an overlap-area display process module for, if a plurality of areas are displayed in correspondence with retrieval conditions respectively on the display screen, displaying an image of a data that simultaneously satisfies the retrieval conditions corresponding to the plurality of areas, in an overlap area between the areas.

23. A computer-readable storage medium holding program codes for retrieving desired data from a plurality of data stored in data storage means, comprising:

a retrieval process module for retrieving data that satisfies a retrieval condition from said data storage means;

a display process module for displaying an image on a display screen, corresponding to the data retrieved by said retrieval process module, within an area provided in correspondence with the retrieval condition;

a movement designation process module for moving a first area displayed on the display screen; and an image-movement display process module for, if a distance between the first area moved by said movement designation process module and a second area comes to be within a predetermined range, displaying an image of a data that simultaneously satisfies retrieval conditions corresponding to the first and second areas, at positions in each of the first and second areas, closer to each other.

24. The computer-readable storage medium according to claim 23, further comprising a movement process module for, if a plurality of areas are displayed on the display screen and at least one of the areas is moved on the display screen, moving images of data in the areas that respectively satisfy only one of the retrieval conditions corresponding to the plurality of areas, away from other areas.

* * * * *